(12) United States Patent
Gowen

(10) Patent No.: US 10,786,031 B2
(45) Date of Patent: Sep. 29, 2020

(54) HELMET ASSEMBLY

(71) Applicant: Christopher D. Gowen, Studio City, CA (US)

(72) Inventor: Christopher D. Gowen, Studio City, CA (US)

(*) Notice: Subject to any disclaimer, the term of this patent is extended or adjusted under 35 U.S.C. 154(b) by 897 days.

(21) Appl. No.: 14/749,559

(22) Filed: Jun. 24, 2015

(65) Prior Publication Data
US 2016/0374424 A1 Dec. 29, 2016

(51) Int. Cl.
A42B 3/08 (2006.01)
F16B 21/09 (2006.01)

(52) U.S. Cl.
CPC .............. A42B 3/08 (2013.01); F16B 21/09 (2013.01)

(58) Field of Classification Search
CPC .. A42B 3/08; A42B 7/00; A42B 3/205; F16B 21/09
USPC .................................................... 2/421, 422
See application file for complete search history.

(56) References Cited

U.S. PATENT DOCUMENTS

| 3,789,467 | A | * | 2/1974 | Aratani | A42B 3/08 24/313 |
| 5,584,106 | A | * | 12/1996 | Anscher | A42B 3/08 24/615 |
| 7,114,197 | B2 | * | 10/2006 | Garneau | A42B 3/085 2/421 |
| 8,733,989 | B1 | * | 5/2014 | Lo | A42B 3/044 362/473 |
| 9,961,953 | B1 | * | 5/2018 | VanHoutin | A42B 3/328 |
| 2008/0092277 | A1 | * | 4/2008 | Kraemer | A42B 3/205 2/421 |
| 2011/0094018 | A1 | * | 4/2011 | Rogers | A42B 3/08 2/421 |
| 2013/0227767 | A1 | * | 9/2013 | Bancroft | A42B 3/08 2/421 |
| 2016/0192726 | A1 | * | 7/2016 | Gaudillere | A42B 3/145 2/421 |

* cited by examiner

Primary Examiner — Alissa L Hoey
Assistant Examiner — Catherine M Ferreira
(74) Attorney, Agent, or Firm — Lewis Roca Rothgerber Christie LLP

(57) ABSTRACT

A mechanical connector configured to releasably engage a stud is disclosed. The mechanical connector includes a housing having a central opening configured to receive the stud, first and second clamps housed in the housing, first and second biasing members coupled to the first and second clamps, and first and second separators coupled to the housing. The first and second clamps each include a pair of arcuate arms. The first and second clamps are configured to move between an engaged position and a disengaged position. The first and second biasing members are configured to bias the first and second clamps into the engaged position. The first and second separators are configured to move between an extended position in which the first and second clamps are in the engaged position and a depressed position in which the first and second clamps are in the disengaged position.

9 Claims, 7 Drawing Sheets

HELMET ASSEMBLY

FIELD

The present disclosure relates generally to mechanical connectors and, more particularly, to releasable mechanical connectors.

BACKGROUND

Quick-release mechanisms are used in a variety of industries to facilitate rapid connection and disconnection of two or more components to each other. For instance, quick-release mechanisms may be used to releasably secure a chinstrap to a helmet. Conventional chinstraps include button-type snaps configured to engage a stud on the helmet. However, these conventional button-type snaps on the chinstrap are prone to inadvertently disengaging the button-type studs on the helmet. The inadvertent disengagement between the button-type snaps on the chinstrap and the button-type studs on the helmet may endanger the wearer of the helmet when, for instance, the helmet is used for safety during a sporting event or on a construction site. For instance, if a player is wearing a sport helmet (e.g., a football helmet) having a chinstrap secured to the helmet with conventional button snaps and studs, the chinstrap may become inadvertently dislodged from the sport helmet (e.g., due to a hard impact from a tackle), which may endanger the player if the helmet becomes dislodged from the player's head due to the loss of support from the chinstrap.

SUMMARY

The present disclosure is directed to various embodiments of a mechanical connector configured to releasably engage a stud. In one embodiment, the mechanical connector includes a housing defining a central opening configured to receive the stud, first and second clamps housed in the housing, first and second biasing members coupled to respective ones of the first and second clamps, and first and second separators coupled to the housing. Each of the first and second clamps includes a pair of arcuate arms. The first and second clamps are configured to move between an engaged position and a disengaged position. The first and second biasing members are configured to bias the first and second clamps into the engaged position. The first and second separators are configured to move between an extended position in which the first and second clamps are in the engaged position and a depressed position in which the first and second clamps are in the disengaged position. The first separator may be opposite the second separator, and the first clamp may be opposite the second clamp. The first and second separators may be configured to move in a first direction between the extended and depressed positions and the first and second clamps may be configured to move in a second direction substantially perpendicular to the first direction between the engaged and disengaged positions. The mechanical connector may also include a button coupled to each of the first and second separators. Each of the buttons is exposed on an exterior surface of the housing. The mechanical connector may also include a pair of strap connectors coupled the housing. Each strap connector defines a slot configured to receive a chinstrap. The first and second biasing members may be further configured to bias the first and second separators into the extended position. When the first and second clamps are in the engaged position, the arcuate arms of the first clamp may contact the arcuate arms of the second clamp and when the first and second clamps are in the disengaged position, the arcuate arms of the first clamp are spaced apart from the arcuate arms of the second clamp. The first and second biasing members may be plungers. When the first and second separators are in the depressed position, the first and second separators may be located between the first and second clamps. Each of the separators may include a wedge-shaped head having a pair of oblique, outwardly facing interface surfaces, each of the arcuate arms may include an oblique, inwardly facing interface surface, and the oblique, outwardly facing interface surfaces may engage the oblique, inwardly facing interface surfaces when the separators are in the depressed position. Each of the clamps may also include at least one arcuate lip. When the clamps are in the engaged position, the arcuate lip on each of the clamps may extend into the central opening, and when the clamps are in the disengaged position, the arcuate lip on each of the clamps may not extend into the central opening.

The present disclosure is also directed to various embodiments of a helmet assembly. In one embodiment, the helmet assembly includes a helmet, a pair of studs configured to be coupled to the helmet, a chinstrap assembly configured to be detachably coupled to the pair of studs, and a pair of mechanical connectors configured to be coupled to the chinstrap and configured to releasably couple the chinstrap to the pair of studs. Each of the mechanical connectors includes a housing defining a central opening configured to receive the stud, first and second clamps housed in the housing, first and second biasing members coupled to outer ends of respective ones of the first and second clamps, first and second separators coupled to the housing, and a pair of strap connectors coupled the housing. Each of the first and second clamps includes a pair of arcuate arms. The first and second clamps are configured to move between an engaged position engaging the stud and a disengaged position. The first and second biasing members configured to bias the first and second clamps into the engaged position. The first and second separators are configured to move between an extended position in which the first and second clamps are in the engaged position and a depressed position in which the first and second clamps are in the disengaged position. Each strap connector defines a slot configured to receive a strap of the chinstrap. Each of the studs may include an annular groove. Each of the clamps may further include at least one arcuate lip. When one mechanical connector is coupled to one of the studs and the clamps are in the engaged position, the arcuate lip on each of the clamps may extend into the annular groove in the stud, and when the clamps are in the disengaged position, the arcuate lip on each of the clamps may be retracted out of the annular groove in the stud. The first separator may be opposite the second separator and the first clamp may be opposite the second clamp. Each of the studs may include a mushroom-shaped head. Each of the studs may include a chamfered edge. When the first and second clamps are in the engaged position, the arcuate arms of the first and second clamps may extend around the stud. The first and second separators may be configured to move in a first direction between the extended and depressed positions and the first and second clamps may be configured to move in a second direction substantially perpendicular to the first direction between the engaged and disengaged positions.

This summary is provided to introduce a selection of concepts that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiments of a mechanical connector. The mechanical connector according to various embodiments of the present disclosure is configured to facilitate rapid connection and disconnection between a chinstrap and a helmet (e.g., a football helmet, a softball helmet, a baseball helmet, a lacrosse helmet, a climbing helmet, an equestrian helmet, a jai alai helmet, a bicycle helmet, a rodeo helmet, a hockey helmet, or a construction helmet). The mechanical connector according to various embodiments of the present disclosure may be configured to reduce the likelihood of inadvertent disconnection between the chinstrap and the helmet compared to conventional button-type chinstrap connectors.

Figure 1A:
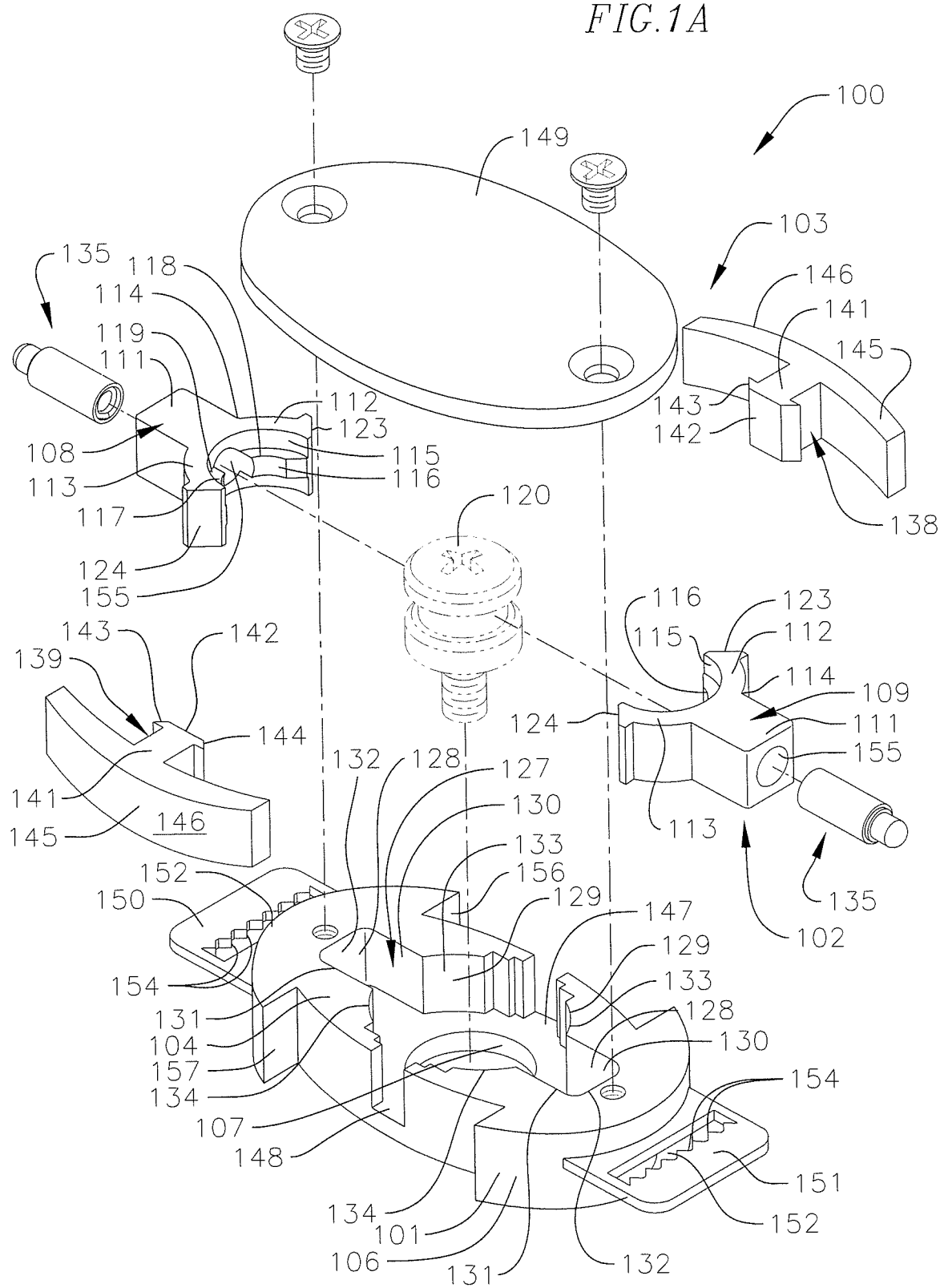
FIG. 1A is an exploded perspective view of a mechanical connector according to one embodiment of the present disclosure.
Figure 1B:
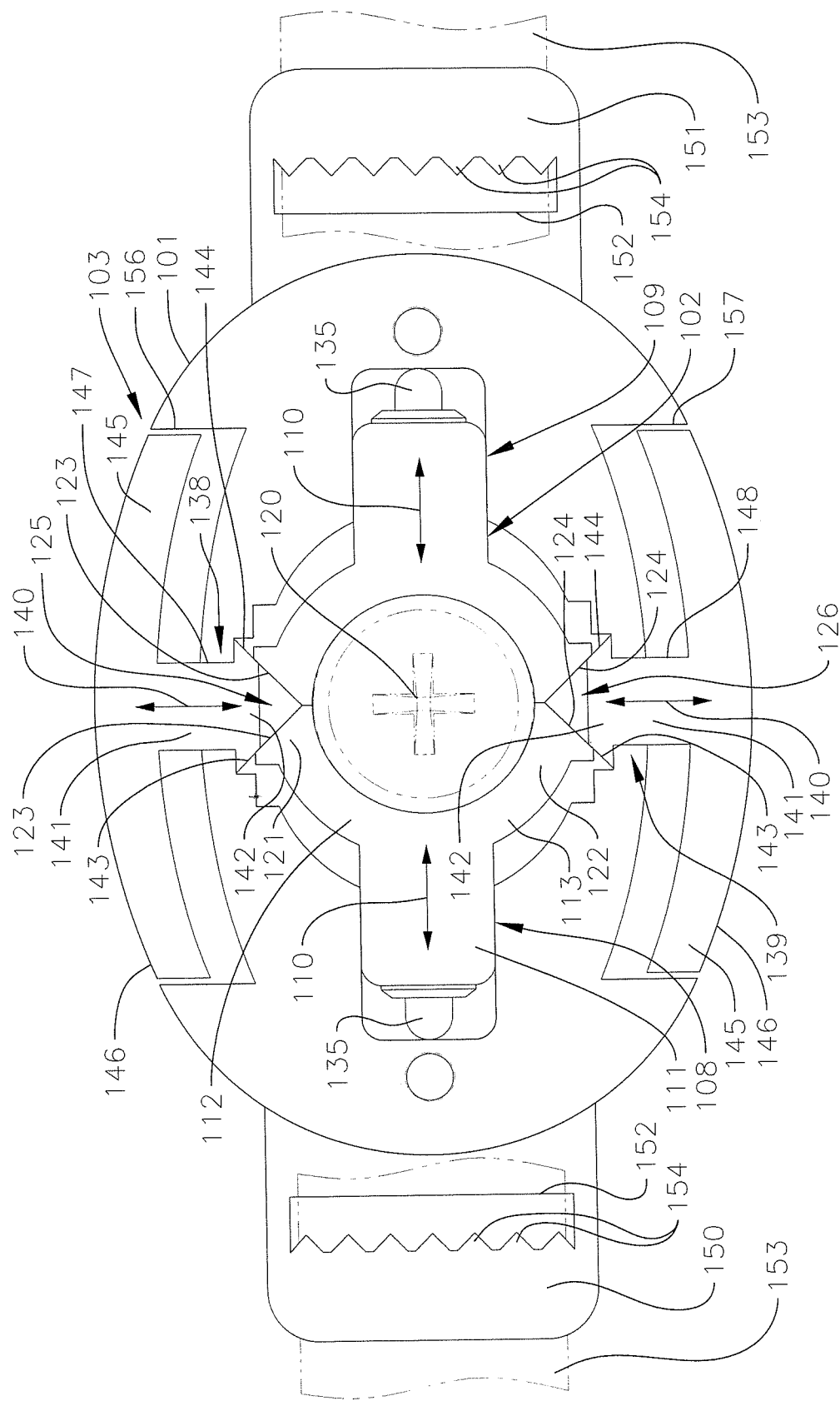
FIGS. 1B and 1C are top views of the embodiment of the mechanical connector illustrated in FIG. 1A in an engaged position and a disengaged position, respectively.
Figure 1C:
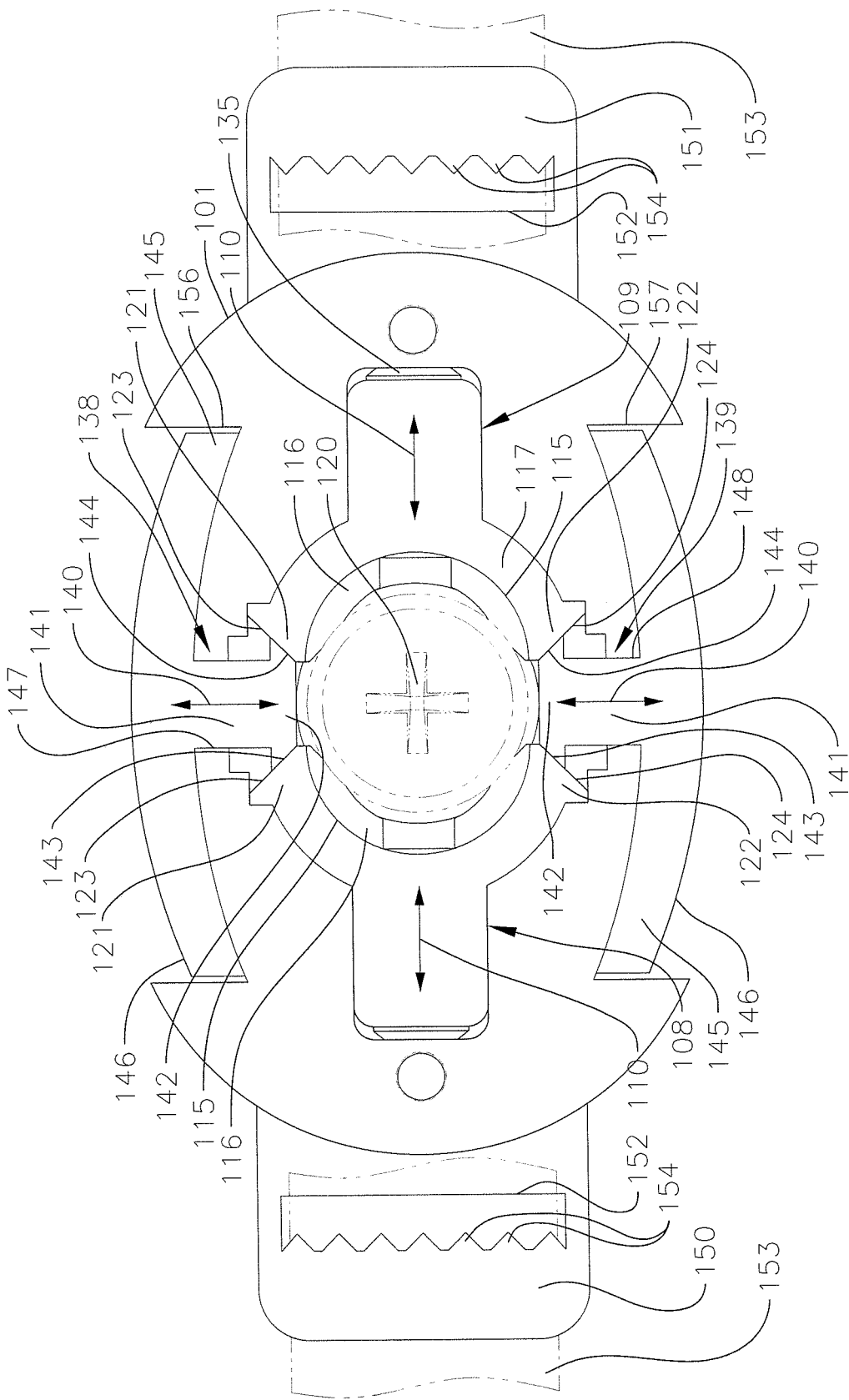

With reference now to FIGS. 1A-1C, a mechanical connector 100 according to one embodiment of the present disclosure includes a housing 101, a latch mechanism assembly 102 housed in the housing 101, and a release mechanism assembly 103 coupled to the housing 101. In the illustrated embodiment, the housing 101 is ovular and includes an upper oval wall 104, a lower oval wall 105, and an oval sidewall 106 extending between the upper and lower oval walls 104, 105. In the illustrated embodiment, the housing 101 also defines a central opening 107 (e.g., a through hole) extending from the upper wall 104 to the lower wall 105. As described in more detail below, the central opening 107 is configured accept or receive a stud 120 (e.g., a stud on a helmet). Although in the illustrated embodiment the housing 101 is ovular, in one or more embodiments, the housing 101 may have any other suitable shape, such as, for instance, a prismatic shape (e.g., a rectangular prism).

In the embodiment illustrated in FIGS. 1A-1C, the latch mechanism assembly 102 includes a pair of opposing clamps 108, 109. The opposing clamps 108, 109 are configured to slide (arrow 110) radially inward and outward between an engaged position (see FIG. 1B) and a disengaged position (see FIG. 1C). In the illustrated embodiment, each clamp 108, 109 includes a stem 111 and pair of arcuate arms 112, 113 extending inward and outward in opposite directions from an inner end 114 of the stem 111. Together, the arms 112, 113 extend in a semi-circle, although in one or more embodiments, the arcuate arms 112, 113 may extend to any other suitable extend, such as, for instance, less than approximately 180 degrees. Additionally, in the illustrated embodiment, the arcuate arms 112, 113 include a curved, inwardly facing engagement surface 115.

In the illustrated embodiment, each clamp 108, 109 also includes a pair of arcuate flanges or lips 116, 117 extending inward from the engagement surface 115. When the clamps 108, 109 are in the engaged position (see FIG. 1B), the arcuate lips 116, 117 on the arms 112, 113 of the clamps 108, 109 extend into the central opening 107 in the housing 101. When the clamps 108, 109 are in the disengaged position (see FIG. 1C), the arcuate lips 116, 117 on the arms 112, 113 of the clamps 108, 109 are retracted such that the arcuate lips 116, 117 do not extend into the central opening 107 in the housing 101. In the illustrated embodiment, the arcuate lips 116, 117 on each clamp 108, 109 are spaced apart from each other. In one or more embodiments, the clamps 108, 109 may include any other suitable number of arcuate lips 116, 117, such as, for instance, a single continuous arcuate lip extending along substantially an entire length of the engagement surface 115 (e.g., each clamp 108, 109 may include a single lip extending continuously across substantially an entire length of the arcuate arms 112, 113). Additionally, in the illustrated embodiment, the arcuate lips 116, 117 are recessed such that a pair of steps 118, 119 is defined between the arcuate lips 116, 117 and the engagement surface 115 of the arms 112, 113 (e.g., the arcuate lips 116, 117 are thinner than the arms 112, 113). As described in detail with reference to the embodiment illustrated in FIG. 2, the engagement surface 115 and the pair of arcuate lips 116, 117 on each of the clamps 108, 109 are configured to engage the stud 120 (e.g., a stud on a helmet) to releasably couple the mechanical connector 100 to the stud 120.

Additionally, in the illustrated embodiment, an outer end 121, 122 of each of the arms 112, 113 includes an oblique, inwardly facing interface surface 123, 124. Together, the inwardly facing interface surfaces 123, 124 on one of the clamps 108 and the corresponding inwardly facing interface surfaces 123, 124 on the opposing clamp 109 define a pair of opposing wedge-shaped receptacles 125, 126. As described in detail below, the inwardly facing interface surface 123, 124 on the arms 112, 113 of the clamps 108, 109 are configured to be engaged by the release mechanism assembly 103 when the release mechanism assembly 103 is actuated to move (arrow 110) the clamps 108, 109 into the disengaged position.

With continued reference to the embodiment illustrated in FIGS. 1A-1C, the housing 101 defines an interior cavity or chamber 127 configured to receive the opposing clamps 108, 109. The interior chamber 127 defined in the housing 101 extends from the upper wall 104 toward the lower wall 105. In the illustrated embodiment, the interior chamber 127 in the housing 101 includes a pair of opposing channels 128 and a pair of larger semi-circular grooves 129 at inner ends of the channels 128. In the illustrated embodiment, the channels 128 are rectangular and are defined by a pair of spaced apart sidewalls 130, 131 and an outer wall 132 extending between outer ends of the sidewalls 130, 131. Additionally, in the illustrated embodiment, the semi-circular grooves 129 are each defined by a pair of curved wall segments 133, 134 extending inwardly and outwardly from the sidewalls 130, 131, respectively, of the channels 128. The opposing channels 128 defined in the housing 101 are sized to accommodate the stems 111 of the clamps 108, 109 as the clamps 108, 109 slide (arrow 110) between the engaged and disengaged positions. Similarly, the semicircular grooves 129 defined in the housing 101 are sized to accommodate the arms 112, 113 of the clamps 108, 109 as the clamps 108, 109 slide (arrow 110) between the engaged and disengaged positions. In one or more embodiments, the interior chamber 127 defined in the housing 101 may have any other suitable shape depending on the shape of the opposing clamps 108, 109 (i.e., the interior chamber 127 in the housing 101 may have any suitable shape configured to accommodate the opposing clamps 108, 109 as the clamps 108, 109 slide (arrow 110) between the engaged and disengaged position).

Additionally, in the illustrated embodiment, the latch mechanism assembly 102 also includes a pair of biasing mechanisms 135 coupled to the stems 111 of the clamps 108, 109. In the illustrated embodiment, the biasing mechanisms 135 are received in openings 155 extending through the stems 111 of the clamps 108, 109. Each of the biasing mechanisms 135 bears against the outer wall 132 of the channels 128 defined in the housing 101. The biasing mechanisms 135 are configured to bias the opposing clamps 108, 109 into the engaged position. The biasing mechanisms 135 may be any suitable type of mechanism configured to supply an inwardly biasing force to the clamps 108, 109, such as, for instance, a resilient member (e.g., one or more coil springs and/or plungers, such as one or more spring-loaded plungers). Additionally, in the illustrated embodiment, engagement between the sidewalls 130, 131 of the channels 128 defined in the housing 101 and corresponding sidewalls 136, 137 of the stems 111 of the clamps 108, 109 is configured to guide the clamps 108, 109 as they slide (arrow 110) between the engaged and disengaged positions.

Still referring to the embodiment illustrated in FIGS. 1A-1C, the release mechanism assembly 103 includes a pair of opposing separators 138, 139. The separators 138, 139 are configured to move (arrow 140) between an extended position (see FIG. 1B) and a depressed position (see FIG. 1B). As illustrated in FIG. 1B, when the separators 138, 139 are in the extended position, the clamps 108, 109 are in the engaged position. When the clamps 108, 109 are in the engaged position, the outer ends 121, 122 of the arms 112, 113 on one of the clamps 108 engage the outer ends 121, 122 of the arms 112, 113 on the other clamp 109. As illustrated in FIG. 1C, when the separators 138, 139 are moved (arrow 140) into the depressed position (e.g., by pressing the separators 138, 139 inward with sufficient force to overcome the biasing force of the biasing mechanisms 135), the separators 138, 139 force the clamps 108, 109 into the disengaged position. Additionally, as illustrated in FIG. 1C, when the separators 138, 139 are in the depressed position and the clamps 108, 109 are in the disengaged position, the outer ends 121, 122 of the arms 112, 113 on one of the clamps 108 are spaced apart from the outer ends 121, 122 of the arms 112, 113 on the other clamp 109 by at least a portion of the separators 138, 139 (e.g., at least a portion of one of the separators 138 is disposed between the outer ends 121 of the arms 112 of the clamps 108, 109 and at least a portion of the other separator 139 is disposed between the outer ends 122 of the arms 113 of the clamps 108, 109). In the illustrated embodiment, the separators 138, 139 are offset from the clamps 108, 109 by an angle of approximately 90 degrees. Accordingly, in the illustrated embodiment, the clamps 108, 109 are configured to move (arrow 110) between the engaged and disengaged positions in a first direction and the separators 138, 139 are configured to move (arrow 140) between the extended and depressed positions in a second direction that is perpendicular or substantially perpendicular to the first direction.

In the illustrated embodiment, each of the separators 138, 139 includes a stem 141 and a wedge-shaped head 142 on an inner end of the stem 141. In the illustrated embodiment, the wedge-shaped head 142 on each of the separators 138, 139 includes a pair of oblique, outwardly facing interface surfaces 143, 144. The outwardly facing interface surfaces 143, 144 on the separators 138, 139 are configured to engage the inwardly facing interface surfaces 123, 124 on the outer ends 121, 122 of the arms 112, 113 of the clamps 108, 109. The engagement between the interface surfaces 143, 144 on the separators 138, 139 and the interface surfaces 123, 124 on the clamps 108, 109 is configured to move (arrow 110) the clamps 108, 109 into the disengaged position when the separators 138, 139 are depressed with sufficient force to overcome the biasing force of the biasing mechanisms 135.

Additionally, in the illustrated embodiment, the release mechanism assembly 103 also includes a button 145 coupled to each of the separators 138, 139. The buttons 145 are configured to be engaged by a user to move (arrow 140) the separators 138, 139 into the depressed position. In one or more embodiments, the user may depress the separators 138, 139, and thereby move the clamps 108, 109 into the disengaged position, by pinching the buttons 145 between the user's thumb and forefinger. When a user releases the buttons 145, the biasing mechanisms 135 are configured to return the separators 138, 139 and the buttons 145 to the extended position. In the illustrated embodiment, the buttons 145 extend in a direction generally transverse to the separators 138, 139. Additionally, in one or more embodiments, the buttons 145 may generally conform to the sidewall 106 of the housing 101 (e.g., the buttons 145 may be flush with the sidewall 106 of the housing 101). For instance, in the illustrated embodiment, the buttons 145 are arcuate and generally conform to the contour of the oval sidewall 106 of the housing 101. In or more embodiments, the buttons 145 in the extended position may protrude out from the sidewall 106 of the housing 101. In one or more embodiments, an outer surface 146 of each of the buttons 145 may include one or more friction-inducing surface features, such as, for instance, a knurled surface, striations, etching, grooves, ridges, or a coating, which are configured to prevent the user's fingers from inadvertently disengaging the buttons 145 when the user is depressing the buttons 145 to release the mechanical connector 100 from the stud 120.

Still referring to the embodiment illustrated in FIGS. 1A-1C, the sidewall 106 of the housing 101 defines a pair of opposing openings 147, 148. The opposing openings 147, 148 in the sidewall 106 of the housing 101 are configured to accommodate the stems 141 of the separators 138, 139. The stems 141 of the separators 138, 139 extend into the interior chamber 127 defined in the housing 101 through the opposing openings 147, 148 in the sidewall 106 of the housing 101. Additionally, in the illustrated embodiment, the buttons 145 are exposed on an exterior surface of the housing 101 such that the buttons 145 can be easily accessed by a user. In the illustrated embodiment, the size of the openings 147, 148 in the sidewall 106 of the housing 101 are smaller than the wedge-shaped heads 142 on the separators 138, 139 such the wedge-shaped heads 142 on the separators 138, 139 are retained in the interior chamber 127 of the housing 101. Additionally, in the illustrated embodiment, the sidewall 106 of the housing 101 defines a pair of recesses 156, 157 configured to accommodate the buttons 145. Additionally, in the illustrated embodiment, the recesses 156, 157 in the sidewall 106 of the housing 101 are configured to prevent the buttons 145 from getting snagged.

Additionally, in the embodiment illustrated in FIG. 1A, the mechanical connector 100 also includes a housing cover 149 coupled to the upper wall 104 of the housing 101. In the illustrated embodiment, the housing cover 149 is ovular, although in one or more embodiments, the housing cover 149 may have any other suitable shape, such as, for instance, rectangular. The housing cover 149 is configured to retain the latch mechanism assembly 102 and at least a portion of the release mechanism assembly 103 in the interior chamber 127 defined in the housing 101. In one embodiment, the entirety of the release mechanism assembly 103 may be housed in the interior chamber 127 defined in the housing 101. The housing cover 149 may be either fixedly or removably coupled to the housing 101. The housing cover 149 may be removably coupled to the housing 101 by any suitable mechanism, such as, for instance, one or more fasteners (e.g., screws). The housing cover 149 may be fixedly coupled to the housing 101 by any suitable manufacturing process or technique, such as, for instance, welding. In the illustrated embodiment, due to the recesses 156, 157 in the sidewall 106 of the housing 101 that accommodate the buttons 145, the cover 149 and the sidewall 106 of the housing 101 together extend completely around a periphery of each of the buttons 145 such that the buttons 145 do not present a risk of getting snagged.

Still referring to the embodiment illustrated in FIGS. 1A-1C, the mechanical connector 100 also includes a pair of opposing strap connectors 150, 151 extending outward in opposite directions from the housing 101. Each of the strap connectors 150, 151 defines a slot 152 configured to receive a strap 153 (e.g., a strap of a chinstrap, such as, for instance, a chinstrap configured to be releasably connected to a helmet). Additionally, in the illustrated embodiment, each of the strap connectors 150, 151 includes a series of serrations 154 extending into the slot 152. The serrations 154 are configured to dig into the strap 153. The strap 153 may be secured to the mechanical connector 100 by inserting the strap 153 up through the slot 152 in one of the strap connectors 150, extending the strap 153 across the housing cover 149, and then inserting the strap 153 down through the slot 152 in the other strap connector 151. In the illustrated embodiment, the strap connectors 150, 151 are in-line with the pair of opposing clamps 108, 109, although in one or more embodiments, the strap connectors 150, 151 may have any other suitable orientation on the housing 101. Additionally, in one or more embodiments, the mechanical connector 100 may have any other suitable mechanism for connecting a strap (e.g., a strap of a chinstrap) to the mechanical connector 100, such as, for instance, a clamp and/or a clasp. In one or more embodiments, the mechanical connector 100 may include an internal mechanism for securing the strap 153 to the mechanical connector 100 (e.g., the mechanical connector 100 may include an internal clamp configured to engage the strap such that the portion of the strap coupled to the mechanical connector 100 is concealed within the mechanical connector 100).

Figure 2A:
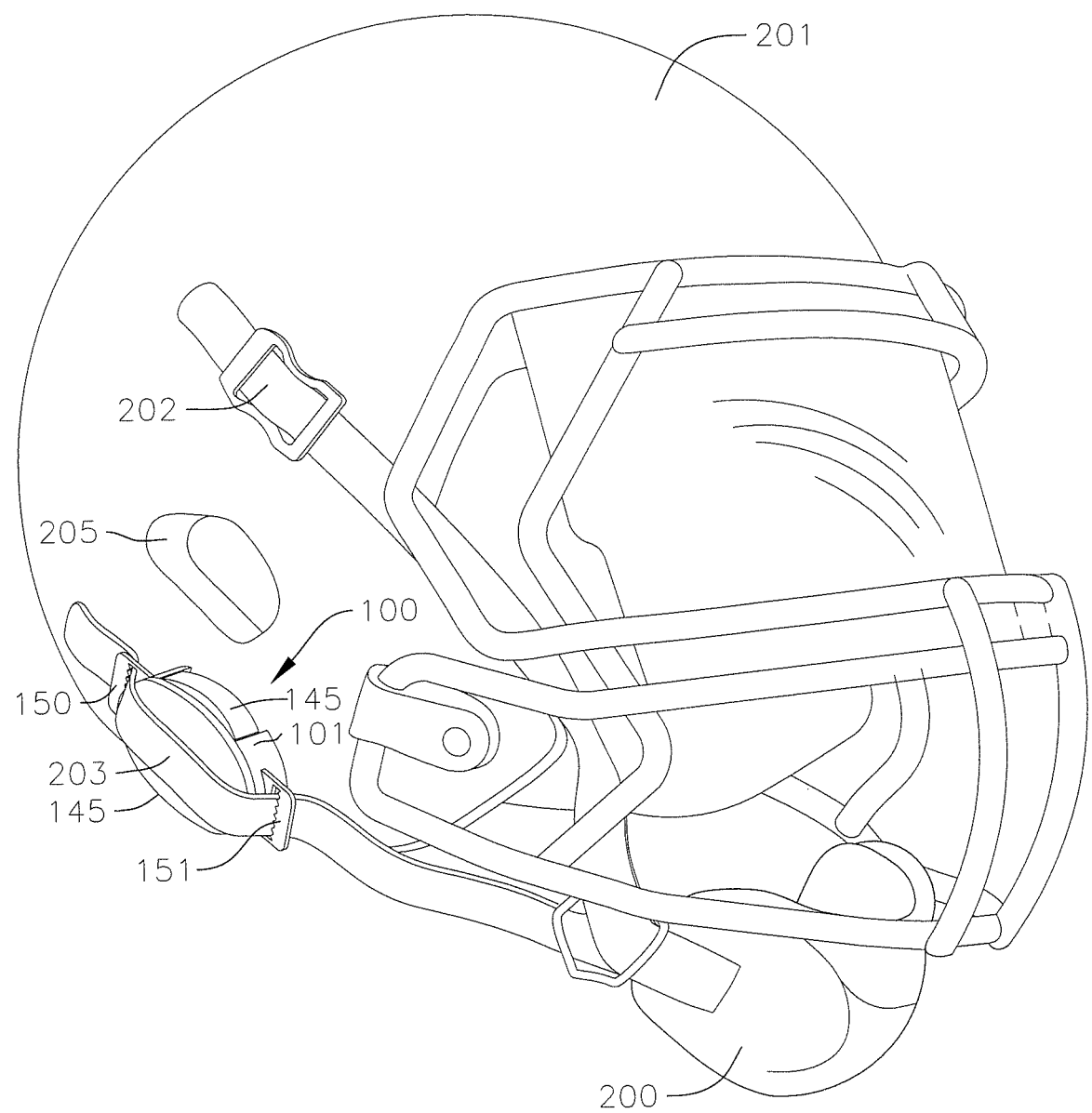
FIGS. 2A and 2B are perspective views of the embodiment of the mechanical connector illustrated in FIGS. 1A-1C configured to detachably connect a chinstrap to a football helmet, in an engaged position and a disengaged position, respectively.
Figure 2B:
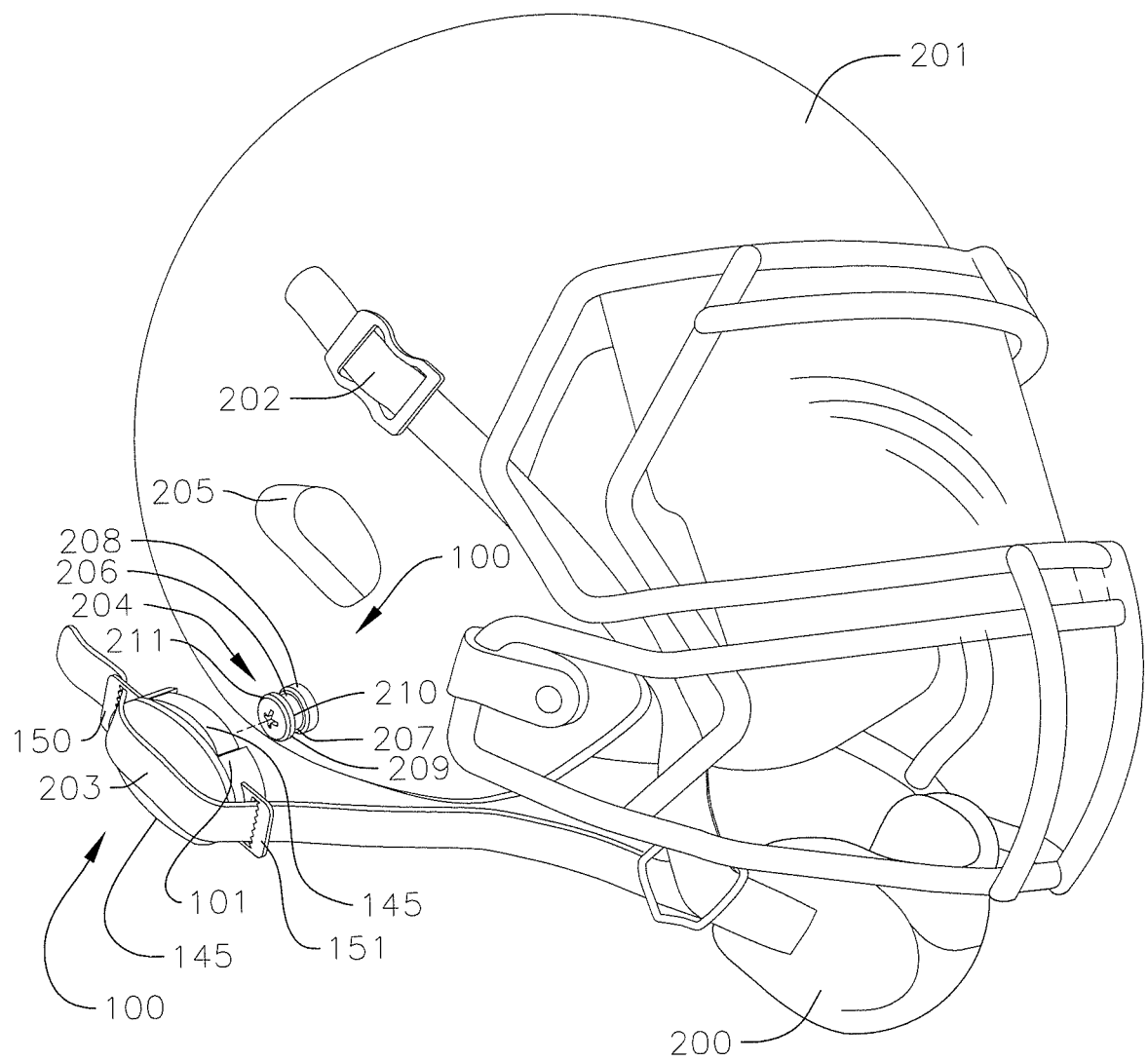

FIGS. 2A and 2B illustrate the embodiment of the mechanical connector 100 illustrated in FIGS. 1A-1C coupling a chinstrap 200 to a football helmet 201. In the illustrated embodiment, the chinstrap 200 is a four-point connection type chinstrap having two upper connection points 202 and two lower connection points 203 to the helmet 201. In the illustrated embodiment, only one of the upper connection points 202 and one of the lower connection points 203 are visible. The mechanical connector 100 may be used to couple any other type of chinstrap to the helmet 201, such as, for instance, a two-point connection type chinstrap. In the illustrated embodiment, the two upper connection points 202 of the chinstrap 200 are configured to remain coupled to the helmet 201 and only the two lower attachment points 203 of the chinstrap 200 are intended to be regularly disconnected from the helmet 201, such as, for instance, when a user desires to remove the helmet 201. Accordingly, in the illustrated embodiment, the two upper connection points 202 of the chinstrap 200 are coupled to the helmet 201 with conventional button-type snaps. In one or more embodiments, the two upper connection points 202 of the chinstrap 200 may be fixedly coupled to the helmet 201.

In the embodiment illustrated in FIG. 2B, the football helmet 201 includes a pair of studs 204 proximate ear holes 205 defined in the helmet 201. Only one of the studs 204 is visible in FIG. 2B. The studs 204 may be coupled to the helmet 201 by any suitable mechanism, such as, for instance, with tee-nuts. Additionally, in the embodiment illustrated in FIG. 2B, each of the studs 204 is a cylindrical member defining annular groove 206 at an intermediate portion 207 of the stud 204 between inner and outer ends 208, 209, respectively, of the stud 204. Accordingly, in the illustrated embodiment, the inner and outer ends 208, 209 of the stud 204 are wider than the intermediate portion 207 of the stud 204. An annular lip or shoulder 210 is defined between the wider outer end 208 of the stud 204 and the narrower intermediate portion 207 of the stud 204. Additionally, in the illustrated embodiment, the outer end 208 of each of the studs 204 includes a chamfered edge 211. In one or more embodiments, the studs 204 may have any other suitable shape, such as, for instance, a mushroom head shape.

To connect the mechanical connector 100 to one of the studs 204 on the helmet 201, the central opening 107 in the housing 101 may be aligned with the stud 204 on the helmet 201 and then the mechanical connector 100 may be advanced toward the stud 204 such that the stud 204 extends up through the central opening 107 in the housing 101. As the stud 204 extends up through the central opening 107 in the housing 101, the chamfered edge 211 on the outer end 208 of the stud 204 contacts the arcuate lips 116, 117 on the opposing clamps 108, 109. When the mechanical connector 100 is pressed with sufficient force to overcome the biasing force of the biasing mechanisms 135, the engagement between the chamfered edge 211 on the stud 204 and the arcuate lips 116, 117 on the clamps 108, 109 forces the clamps 108, 109 to move (arrow 110) radially outward toward the disengaged position. As the stud 204 is advanced further into the central opening 107, the arcuate lips 116, 117 on the opposing clamps 108, 109 become aligned with the annular groove 206 in the stud 204. When the arcuate lips 116, 117 on the clamps 108, 109 are aligned with the annular groove 206 in the stud 204, the clamps 108, 109 are configured to move (arrow 110) back into the engaged position under the biasing force of the biasing mechanisms 135. When the clamps 108, 109 are in the engaged position, the arcuate lips 116, 117 on the clamps 108, 109 extend into the annular groove 206 in the stud 204. Additionally, when the clamps 108, 109 are in the engaged position and the arcuate lips 116, 117 extend into the annular groove 206 in the stud 204, the arcuate lips 116, 117 on the clamps 108, 109 contact the annular shoulder 210 on the stud 204. The engagement between the arcuate lips 116, 117 on the clamps 108, 109 and the annular shoulder 210 on the stud 204 is configured to prevent the mechanical connector 100 from disengaging the stud 204 (i.e., the engagement between the arcuate lips 116, 117 on the clamps 108, 109 and the annular shoulder 210 on the stud 204 is configured to retain the mechanical connector 100 on the stud 204 by preventing the stud 204 from sliding out of the central opening 107 in the housing 101 of the mechanical connector 100).

To disconnect the mechanical connector 100 from the stud 204 on the football helmet 201, the buttons 145 on the release mechanism assembly may be depressed with sufficient force to cause the separators 138, 139 to move (arrow 140) into the depressed position. As the separators 138, 139 move into the depressed position, the interface surfaces 143, 144 on the wedge-shaped heads 142 engage the interface surfaces 123, 124 on the clamps 108, 109 and thereby force the clamps 108, 109 into the disengaged position. As the clamps 108, 109 are moved (arrow 140) into the disengaged position, the arcuate lips 116, 117 on clamps 108, 109 are retracted out of the annular groove 206 in the stud 204. When the clamps 108, 109 are in the disengaged position, the arcuate lips 116, 117 on the clamps 108, 109 may slide past the annular shoulder 210 on the stud 204. Accordingly, with the clamps 108, 109 in the disengaged position, the mechanical connector 100 may be pulled away from the stud 204 until the stud 204 is completely withdrawn from the central opening 107 in the housing 101 of the mechanical connector 100. In this manner, the mechanical connector 100 is configured to facilitate quick and easy connection and disconnection of the chinstrap 200 from the football helmet 201. Accordingly, in one or more embodiments, the mechanical connector 100 is configured to function in the same or similar manner as a quick-release connector.

Although FIGS. 2A and 2B depict the mechanical connector 100 connecting a chinstrap to a football helmet, the mechanical connector 100 of the present disclosure may be used to detachably couple any other suitable components together. For instance, the mechanical connector 100 may be used to releasably couple a chinstrap to a softball helmet, a baseball helmet, a lacrosse helmet, a climbing helmet, an equestrian helmet, a jai alai helmet, a bicycle helmet, a rodeo helmet, a hockey helmet, a construction helmet, or any other type of helmet.

Figure 3A:
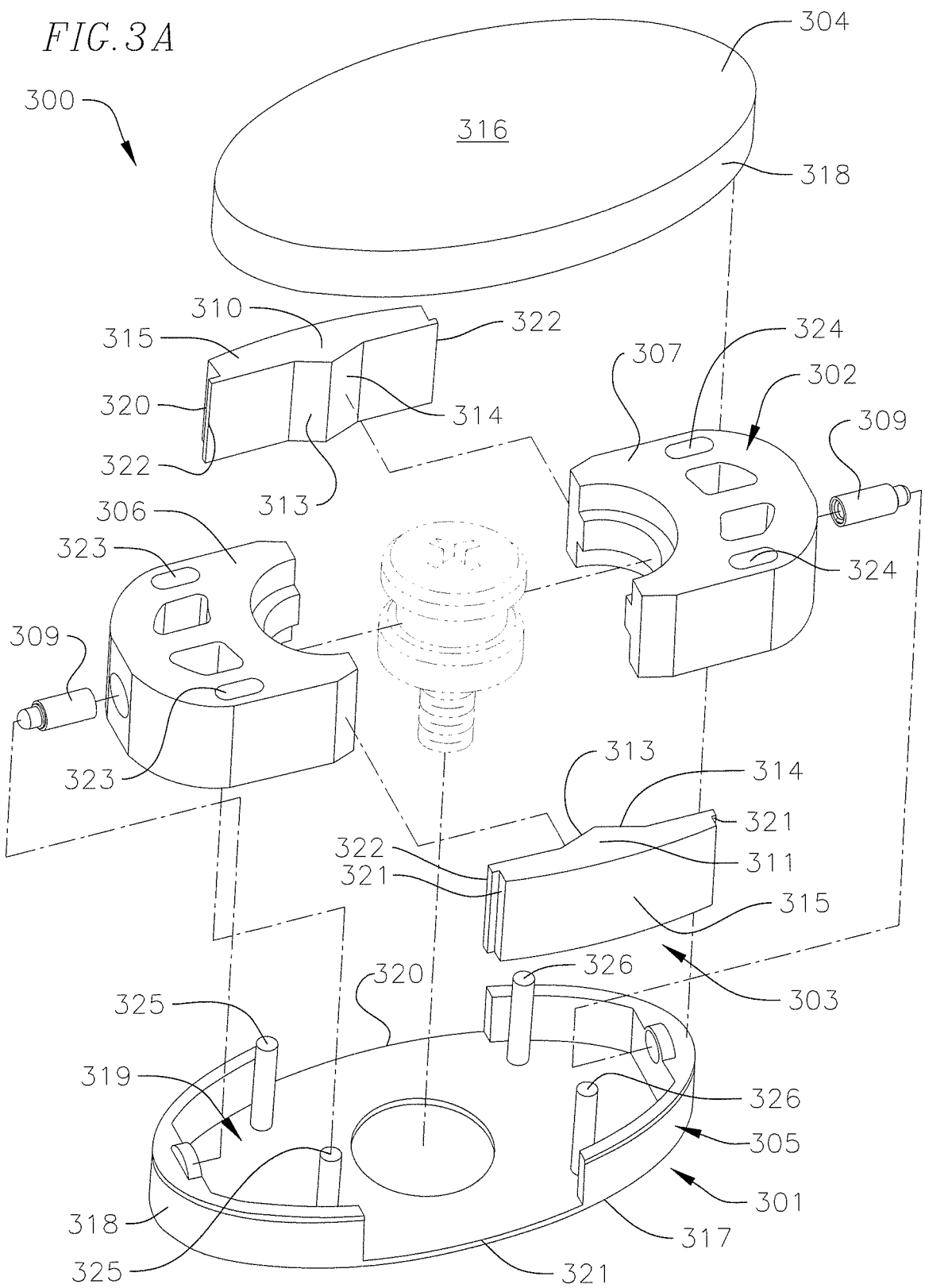
FIGS. 3A and 3B are an exploded perspective view and a perspective view, respectively, of a mechanical connector according to another embodiment of the present disclosure.
Figure 3B:
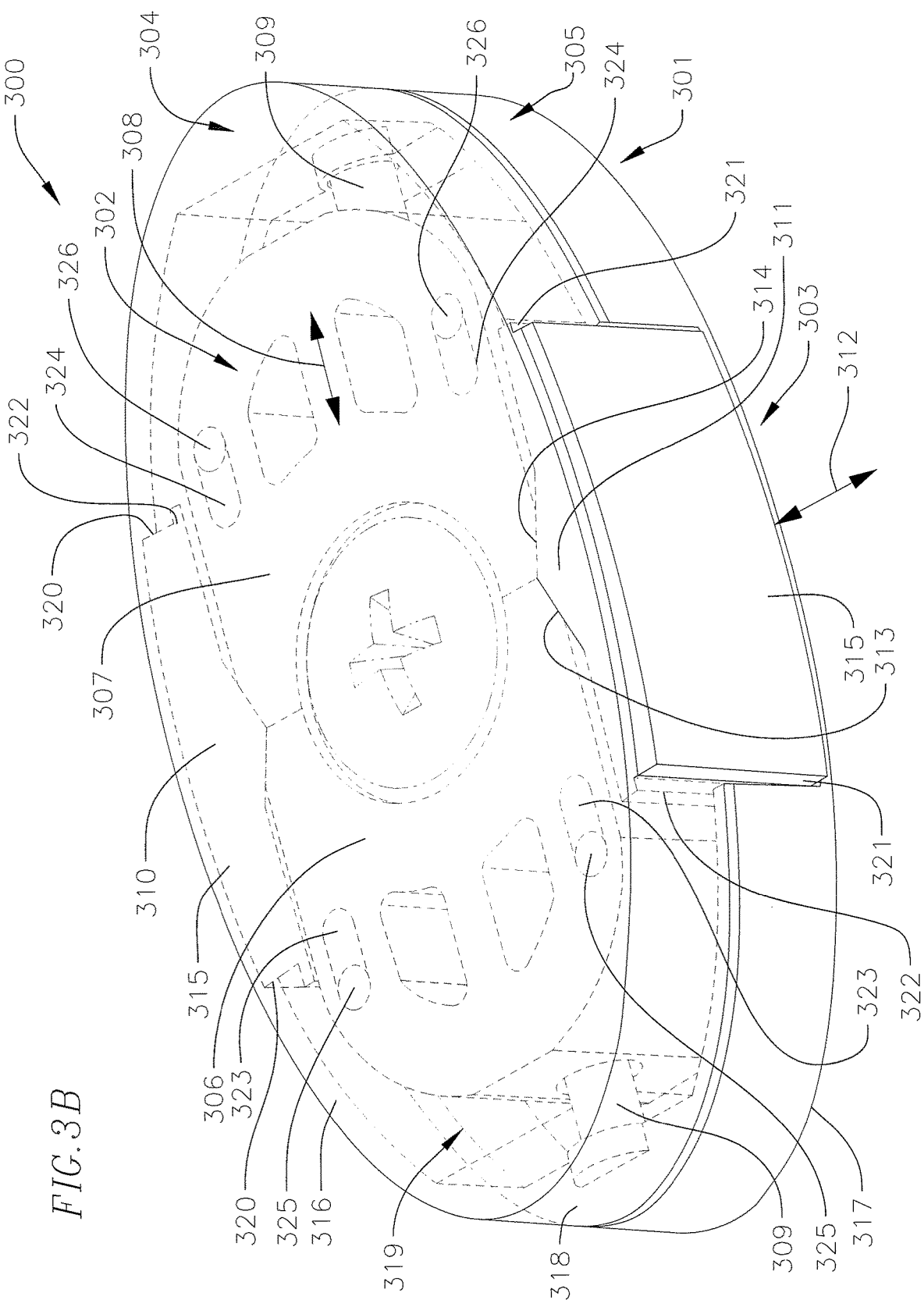

With reference now to FIGS. 3A and 3B, a mechanical connector 300 according to another embodiment of the present disclosure includes a housing 301, a latch mechanism assembly 302 housed in the housing 301, and a release mechanism assembly 303 coupled to the housing 301. In the illustrated embodiment, the housing 301 is ovular and includes an upper housing half 304 and a lower housing half 305 coupled to the upper housing half 304. Additionally, in the illustrated embodiment, the latch mechanism assembly 302 includes a pair of opposing clamps 306, 307 that are configured to slide radially inward and outward (arrow 308) between an engaged position engaging a stud (e.g., a stud coupled to a helmet) and a disengaged position in substantially the same manner as the opposing clamps 108, 109 described above with reference to the embodiment of the mechanical connector 100 illustrated in FIGS. 1A-2B. Additionally, in the embodiment illustrated in FIG. 3, the latch mechanism assembly 302 also includes a pair of biasing mechanisms 309 (e.g., coil springs and/or plungers) coupled to the opposing clamps 306, 307 and configured to bias the clamps 306, 307 into the engaged position. In the illustrated embodiment, each of the clamps 306, 307 also includes a pair of openings 323, 324 (e.g., slots) and the lower housing half 305 includes two pairs of projections 325, 326 configured to extend into the openings 323, 324 in the clamps 306, 307. The engagement between the projections 325, 326 and the openings 323, 324 in the clamps 306, 307 is configured to function as a guide as the clamps 306, 307 slide radially inward and outward (arrow 308) between the engaged position the disengaged position.

Still referring to the embodiment illustrated in FIGS. 3A and 3B, the release mechanism assembly 303 includes a pair of opposing separators 310, 311 configured to move (arrow 312) between an extended position and a depressed position. When the separators 310, 311 are in the extended position, the clamps 306, 307 are in the engaged position, and when the separators 310, 311 are in the depressed position, the clamps 306, 307 are in the disengaged position. The separators 310, 311 are configured to overcome the biasing force of the biasing mechanisms 309 to move the clamps 306, 307 into the disengaged position in substantially the same manner that the separators 138, 139 are configured to move the opposing clamps 108, 109 into the disengaged position, as described above with reference to the embodiment of the mechanical connector 100 illustrated in FIGS. 1A-2B. In the illustrated embodiment, each of the separators 310, 311 includes a wedge-shaped head having a pair of oblique surfaces 313, 314 configured to engage the clamps 306, 307 to move the clamps 306, 307 into the disengaged position. Additionally, in the embodiment illustrated in FIGS. 3A and 3B, the release mechanism assembly 303 also includes a button 315 coupled to each of the separators 310, 311. The buttons 315 are configured to be engaged by a user to move (arrow 312) the separators 310, 311 into the depressed position and thereby move (arrow 308) the clamps 108, 109 into the disengaged position.

Still referring to the embodiment illustrated in FIGS. 3A and 3B, the upper and lower housing halves 304, 305 together include an upper wall 316, a lower wall 317, and a sidewall 318 extending between the upper and lower walls 316, 317. Together, the upper and lower housing halves 304, 305 also define an interior cavity or chamber 319 configured to receive the clamps 306, 307. Furthermore, in the illustrated embodiment, the lower wall 317 of the lower housing half 305 defines a central opening extending up into the interior cavity 319. The central opening is configured to accept or receive the stud. Additionally, in the illustrated embodiment, the sidewall 318 of the housing 301 defines a pair of opposing openings 320, 321 configured to receive the separators 310, 311 (i.e., the separators 310, 311 are configured to extend through the openings 320, 321 in the sidewall 318 and into the interior cavity 319 of the housing 301 to engage the clamps 306, 307). Additionally, in the illustrated embodiment, the buttons 315 generally conform to the sidewall 318 of the housing 301 such that the buttons 315 do not present a risk of getting snagged. Furthermore, in the illustrated embodiment, the release mechanism assembly 303 includes a pair of lips 322 coupled to the buttons 315. The lips 322 are housing in the interior cavity 319 and are wider than the pair of openings 320, 321 in the sidewall 318 of the housing 101 such that the lips 322 are configured to prevent the separators 310, 311 from sliding out of the pair of opposing openings 320, 321 in the sidewall 318 of the housing 101.

Additionally, one or more features or aspects of the mechanical connectors 100, 300 of the present disclosure may be combined or replaced with one or more features or aspects of one or more of the connectors disclosed in U.S. patent application Ser. No. 13/144,489, filed May 24, 2011 and entitled "Chinstrap to Helmet Connector," the entire contents of which are incorporated herein by reference, to make an operable device.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Although relative terms such as "horizontal," "vertical," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or intervening components may be present therebetween.

What is claimed is:

1. A helmet assembly, comprising:
a helmet;
a pair of studs configured to be coupled to the helmet;
a chinstrap assembly configured to be detachably coupled to the pair of studs;
a pair of mechanical connectors configured to be coupled to the chinstrap and configured to releasably couple the chinstrap to the pair of studs, wherein each of the mechanical connectors comprises:
a housing defining a central opening configured to receive the stud;
first and second clamps housed in the housing, each of the first and second clamps comprising a pair of arcuate arms, wherein the first and second clamps are configured to move between an engaged position engaging the stud and a disengaged position;
first and second biasing members coupled to outer ends of respective ones of the first and second clamps, the first and second biasing members configured to bias the first and second clamps into the engaged position;
first and second separators coupled to the housing, wherein the first and second separators are configured to move between an extended position in which the first and second clamps are in the engaged position and a depressed position in which the first and second clamps are in the disengaged position;
a first button coupled to the first separator, and a second button, oppositely disposed from the first button on the housing, coupled to the second separator, wherein the first and second buttons are adapted to be depressed by a thumb and forefinger of a user for operatively disengaging the stud;
wherein each of the first and second separators comprises a wedge-shaped head comprising a pair of oblique, outwardly facing interface surfaces; and
a pair of strap connectors coupled the housing, wherein each strap connector of the pair of strap connectors defines a slot configured to receive a strap of the chinstrap.

2. The helmet assembly of claim 1, wherein each of the pair of studs comprises an annular groove.

3. The helmet assembly of claim 2, wherein:
each of the clamps further comprises at least one arcuate lip,
when one mechanical connector of the pair mechanical connectors is coupled to one stud of the pair of studs and the clamps are in the engaged position, the at least one arcuate lip on each of the clamps extends into the annular groove in the one stud, and
when the clamps are in the disengaged position, the at least one arcuate lip on each of the clamps is retracted out of the annular groove in the one stud.

4. The helmet assembly of claim 1, wherein the first separator is opposite the second separator, and wherein the first clamp is opposite the second clamp.

5. The helmet assembly of claim 1, wherein each stud of the pair of studs comprises a mushroom-shaped head.

6. The helmet assembly of claim 1, wherein each stud of the pair of studs comprises a chamfered edge.

7. The helmet assembly of claim 1, wherein, when the first and second clamps are in the engaged position, the arcuate arms of the first and second clamps extend around the stud.

8. The helmet assembly of claim 1, wherein the first and second separators are configured to move in a first direction between the extended and depressed positions and the first and second clamps are configured to move in a second direction perpendicular to the first direction between the engaged and disengaged positions.

9. The helmet assembly of claim 7, wherein each of the arcuate arms comprises an oblique, inwardly facing interface surface; and
the oblique, outwardly facing interface surfaces engage the oblique, inwardly facing interface surfaces when the separators are in the depressed position.

* * * * *